United States Patent [19]

Whitt, Sr. et al.

[11] Patent Number: 4,529,170
[45] Date of Patent: Jul. 16, 1985

[54] BELT TIGHTENING TOOL

[76] Inventors: Minton E. Whitt, Sr., P.O. Box 58, Farmers, Ky. 40319; Paul H. Packer, 822 11th St., N.E., Dyersville, Iowa 52040

[21] Appl. No.: 475,305

[22] Filed: Mar. 14, 1983

[51] Int. Cl.³ ............................................... B66F 3/00
[52] U.S. Cl. ....................................... 254/131; 81/64; 269/131
[58] Field of Search ........................ 254/120, 243–249, 254/131; 81/64; 269/130–132

[56] References Cited

U.S. PATENT DOCUMENTS 4,244,559  1/1981  Mole ................................... 254/131

Primary Examiner—Frederick R. Schmidt
Assistant Examiner—Judy J. Hartman
Attorney, Agent, or Firm—Frank C. Leach, Jr.

[57] ABSTRACT

A belt, which passes around a pulley on a shaft of an element movable about a pivotal connection to tighten the belt, is tightened by a tool including a body, which rests on the pivotal element, and a handle pivotally mounted to the body. A flexible band has one end attached to the body and is passed around the pivotal element and through guides on the body prior to being releasably connected to the handle. When the handle is pivoted relative to the body with the flexible band tight around the pivotal element, the pivotal element is moved about its pivotal connection to tighten the belt.

9 Claims, 4 Drawing Figures

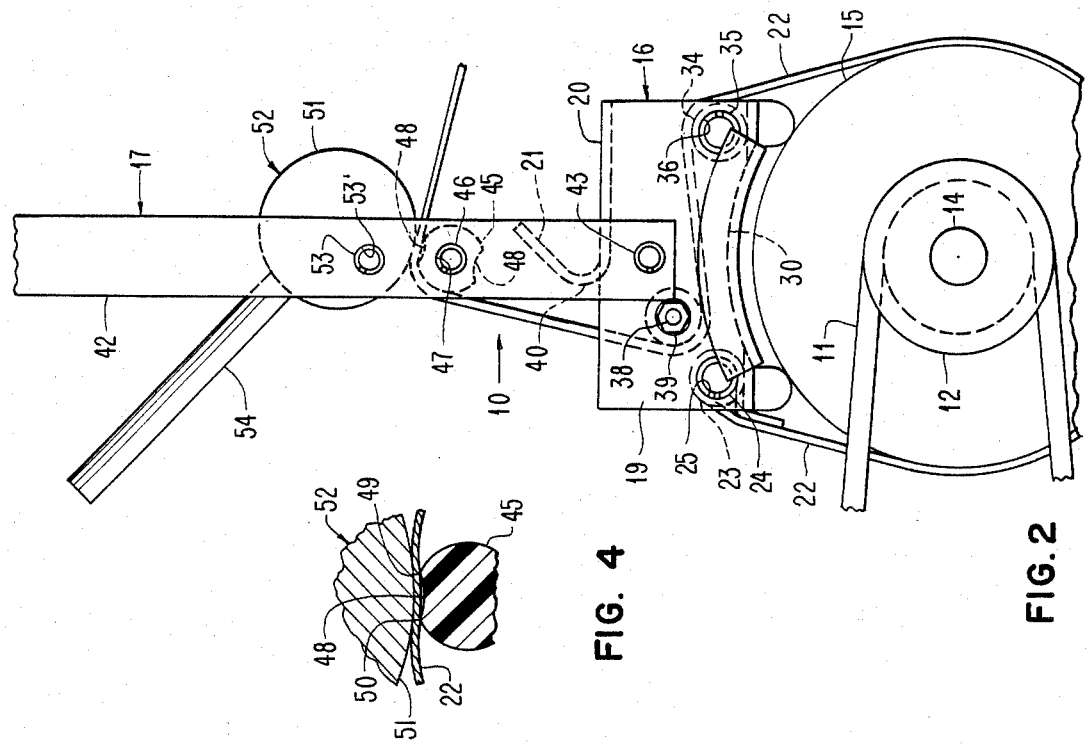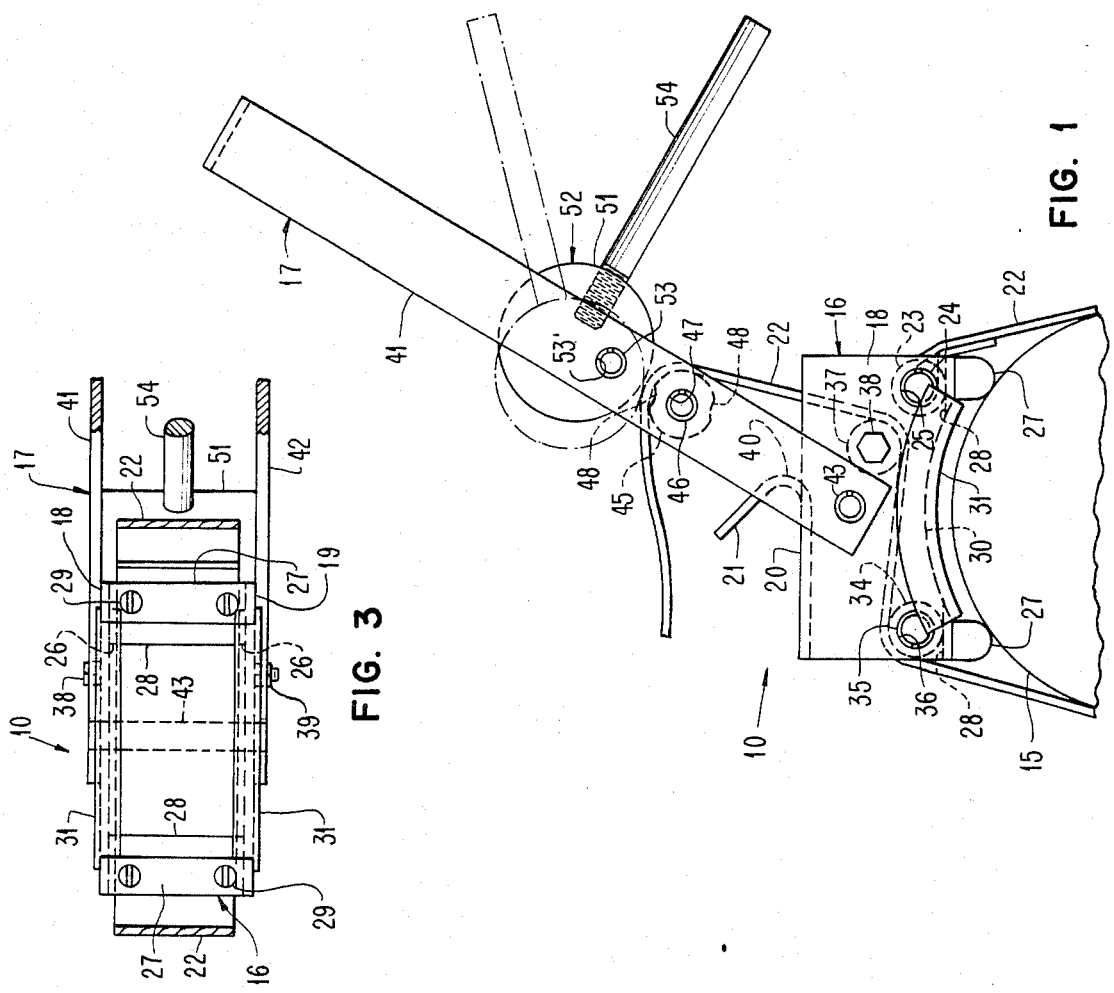

BELT TIGHTENING TOOL

This invention relates to a belt tightening tool and, more particularly, to a tool for moving an element, which has a shaft on which a pulley is disposed and having a belt passing therearound, about its pivotal connection to tighten the belt through moving the pivotal element to a position where the belt has the desired tension and the pivotal element is retained against movement.

In motor vehicles, various elements such as a generator, an alternator, a power steering pump, or an air conditioner compressor, for example, are driven from the internal combustion engine through one or more flexible belts. Each of these elements has a pulley mounted on its shaft with the belt passing therearound and around a pulley driven from an output shaft of the internal combustion engine.

To replace each of these belts, it is necessary for one of the pulleys to be mounted on an element that is movable about a pivotal connection to the engine block so as to enable the belt to pass around the pulley thereon as well as the pulley on the output shaft of the internal combustion engine and then to have the element be pivoted to a position in which the belt is tightened and the pivotal element then locked in that position. For example, a generator or an alternator may be mounted on the engine block by a pivotal connection. The generator or the alternator may be locked in position through the generator or the alternator having a bracket mounted thereon and cooperating with a mounting bracket, which is fixed to the engine block, with one of the two brackets having an arcuate slot therein and the other having an opening to enable a bolt to pass through both of them and be retained in position by a nut. This locks the generator or the alternator in the position in which the belt is sufficiently tightened so as to have the desired tension thereon. If the belt is not tightened sufficiently, damage may occur to the pivotal element.

Because of the rather cramped condition within the engine compartment of a motor vehicle, it is difficult to tighten the belt to the desired tension. Various types of levers for applying a force against the pivotal element such as a crowbar, for example, have been used by mechanics to move the pivotal element about its pivotal connection to a position in which the belt has sufficient tension through being properly tightened, and then holding the pivotal element in this position with the crowbar while locking the pivotal element in this position. This is a difficult operation for one person and is time consuming.

Various types of tools for exerting forces on portions of an internal combustion engine of a motor vehicle are disclosed in U.S. Pat. No. 1,890,227 to McKee, U.S. Pat. No. 2,656,749 to Johnson, U.S. Pat. No. 4,145,938 to Laird, Jr., and U.S. Pat. No. 4,249,296 to Colburn. None of these patents is directed to tightening a belt passing around pulleys through moving a pivotal element having the belt pass around a pulley on its shaft.

The belt tightening tool of the present invention enables a belt, which passes around a pulley on a shaft of a pivotal element, to be tightened by one person through causing movement of the pivotal element about its pivotal connection to the engine block and enabling it to be locked in the position to which it is moved. Thus, the belt tightening tool of the present invention does not require a crowbar, for example, and eliminates the need for a second person to aid in tightening the belt.

The belt tightening tool of the present invention can be readily utilized with any of the pivotal elements in a motor vehicle engine compartment having a pulley around which a belt passes. Therefore, the difficulty of obtaining a position in which a portion of the crowbar may fulcrum on the engine block and exert a force on the pivotal element is avoided by the belt tightening tool of the present invention.

When using a crowbar, for example, the possibility exists that the pivotal element or the portion of the engine block against which the crowbar fulcrums to move the pivotal element may be damaged by the crowbar. The belt tightening tool of the present invention avoids any damage to any element in the engine compartment of the motor vehicle while still obtaining the desired belt tightening.

When using a crowbar, for example, the possibility exists that the crowbar may slip at either its fulcrum or its end engaging the pivotal element. If this occurs, it is possible that the person attempting to tighten the belt may be injured. The belt tightening tool of the present invention reduces the possibility of danger to the user.

The belt tightening tool of the present invention includes a flexible band, which has one end attached to a body, passing around a pivotal element having a pulley around which the belt passes. The flexible band is releasably connected to a handle, which is pivotally mounted on the body. While the flexible band is positioned as tight as possible around the pivotal element, the pivoting of the handle increases the tightening of the flexible band around the pivotal element. Thus, an increased force is exerted on the pivotal element with this increased tightening of the flexible band by pivoting of the handle insuring that the pivotal element is moved to the position in which the belt passing around the pulley on the pivotal element is tightened to the desired tension.

An object of this invention is to provide a tool for tightening a fan belt or the like.

Other objects of this invention will be readily perceived from the following description, claims, and drawing.

This invention relates to a tool for tightening a belt passing around a pulley on a shaft of a pivotal element. The tool includes a body for disposition on the pivotal element and flexible means, which pass around the pivotal element, attached to the body. A handle is pivotally mounted on the body by pivotally mounting means with the handle having means to releasably connect the flexible means to the handle after the flexible means has passed around the pivotal element so that pivoting of the handle moves the pivotal element to tighten the belt passing around the pulley on the shaft of the pivotal element.

The attached drawing illustrates a preferred embodiment of the invention in which:

FIG. 1 is a side elevational view of a belt tightening tool of the present invention mounted on a pivotal element having a pulley around which the belt to be tightened passes;

FIG. 2 is a side elevational view of the belt tightening tool of FIG. 1 and taken from the opposite side to that of FIG. 1 and showing the handle pivoted to cause movement of the pivotal element;

FIG. 3 is a bottom plan view, partly in section, of the body of the tool of FIG. 1; and FIG. 4 is an enlarged fragmentary sectional view of the releasably connecting means for connecting the flexible band to the handle.

Referring to the drawing and particularly FIGS. 1 and 2, there is shown a belt tightening tool 10 for tightening a belt 11 passing around a pulley 12 on a shaft 14 of a pivotal element such as an alternator 15 that is movable about a pivot fixed to the engine block of a motor vehicle when locking means to lock the alternator 15 to the engine block is released, for example. Any other pivotal element, which has a flexible belt like the belt 11 passing around a pulley on its shaft, also may have the belt 11 tightened by the tool 10.

The tool 10 includes a substantially rectangular shaped body 16, which is a hollow square shaped tube, and a U-shaped handle 17 pivotally mounted on the body 16. The body 16 has a pair of side walls 18 and 19 (see FIG. 3), which are substantially parallel to each other. The upper surfaces or edges of the side walls 18 and 19 have a top wall 20 (see FIG. 1) extending therebetween. The top wall 20 does not extend for the entire length of the body 16. The end of the top wall 20 has a angled portion 21 extending therefrom to serve as a guide for a band 22 when the handle 17 is pivoted counterclockwise (as viewed in FIG. 1) beyond the position of FIG. 2.

The band 22, which is formed of any suitable flexible material such as cloth webbing, for example, has a loop 23 at one end passing around an expansion pin 24, which extends between the side walls 18 and 19 (see FIG. 2) of the body 16 and into an opening 25 (see FIG. 1) in each of the side walls 18 and 19 (see FIG. 2). Washers 26 (see FIG. 3) are disposed adjacent the inner surface of each of the side walls 18 and 19 so that the band 22 does not rub against either of the side walls 18 and 19.

Each end of the body 16 has a bumper 27, which is formed of a suitable elastomeric material such as rubber, for example, extending downwardly beyond its bottom surface or edge, as shown in FIG. 1, for engagement with the alternator 15 around which the band 22 is passed. Each of the bumpers 27 is secured to one end of a substantially flat bottom portion 28 (see FIG. 3) of the body 16 by a pair of screws 29.

The flat bottom portions 28 of the body 16 are formed by cutting an arcuate portion 30 (see FIGS. 1 and 2) in each of the side walls 18 and 19 of the body 16. This removes most of the bottom portion of tha body 16 to leave only the flat bottom portions 28 of the body 16. A plastic arcuate strip 31 is attached to each of the side walls 18 and 19.

The body 16 has a guide 34, which is a roller formed of a suitable plastic, disposed above one of the flat bottom portions 28 of the body 16 and extending between the side walls 18 and 19. The guide 34 extends through the side walls 18 and 19 and is supported on an expansion pin 35 extending into an opening 36 in each of the side walls 18 (see FIG. 1) and 19 (see FIG. 2). The band 22 (see FIG. 1) passes around the top of the guide 34.

A roller 37 is supported on a bolt 38 so that the band 22 passes underneath the roller 37. The bolt 38, which extends through the side walls 18 and 19 (see FIG. 3), is retained in position by a nut 39 (see FIG. 2). The roller 37 is disposed so that its leftmost surface in FIG. 1 is in substantially vertical alignment with a curved surface 40 at the junction of the angled portion 21 and the top wall 20 of the body 16.

The U-shaped handle 17 has its substantially parallel legs 41 and 42 (see FIG. 2) disposed on the outer surfaces of the side walls 18 and 19 (see FIG. 3), respectively, of the body 16. The handle 17 (see FIG. 1) is pivotally mounted on the body 16 by an expansion pin 43 extending through the leg 41 of the handle 17, the side wall 18 of the body 16, the side wall 19 (see FIG. 2) of the body 16, and the leg 42 of the handle 17. Thus, the pivotal axis of the handle 17 is to the left of the roller 37 in FIG. 1 and adjacent thereto.

The handle 17 has a plastic rod 45 extending between the legs 41 and 42 (see FIG. 2) and held in position on the handle 17 by an expansion pin 46 (see FIG. 1) passing through the rod 45 and an opening 47 in each of the legs 41 and 42 (see FIG. 2). The rod 45 has a pair of notches 48 (see FIG. 4) formed in its surface although only one of the notches 48 is used and required. Each of the notches 48 defines two spaced portions 49 and 50 of the surface of the rod 45 to be engaged by the band 22 when a roller 51 of cam means 52 is moved into engagement with the band 22 to hold it against the rod 45 as shown in phantom in FIG. 1. This provides two pressure points between the rod 45 and the roller 51.

The roller 51 is eccentrically mounted on the handle 17 (see FIG. 1) by an expansion pin 53, which extends between the legs 41 and 42 (see FIG. 2) of the handle 17 and into an opening 53' in each of the legs 41 (see FIG. 1) and 42 (see FIG. 2). A handle 54 is attached to the roller 51. Accordingly, after the band 22 is passed over the rod 45, the roller 51 is rotated counterclockwise, as viewed in FIG. 1, about the expansion pin 53 by the handle 54 until the roller 51 engages the band 22 against the spaced portions 49 (see FIG. 4) and 50 of the rod 45.

With the band 22 releasably connected to the handle 17 (see FIG. 2) by the roller 51 holding the band 22 against the spaced portions 49 (see FIG. 3) and 50 of the rod 45, the handle 17 (see FIG. 1) is pivoted counterclockwise, as viewed in FIG. 1, about the axis of the expansion pin 43 to tighten the band 22 about the alternator 15. This moves the alternator 15 about its pivotal connection to the engine block to tighten the belt 11 (see FIG. 2) because of the shaft 14 and the pulley 12 being moved away from the fixed pulley on the output shaft of the internal combustion engine around which the belt 11 also passes.

Considering the operation of the present invention, the body 16 of the tool 10 is positioned on the surface of the alternator 15 with any well-known locking means being released so that the alternator 15 can pivot about its pivotal connection to the engine block. One suitable example of the well-known locking means includes a bolt extending through an arcuate slot in one of a bracket on the alternator 15 and a bracket, which is fixed to the engine block, and an opening in the other of the brackets with the bolt being retained by a nut.

Then, the band 22 is passed around the alternator 15 and over the guide 34 and underneath and around the guide roller 37. With the handle 17 in the position of FIG. 1 and the roller 51 of the cam means 52 moved away from the rod 45, the band 22 is passed over the top of the rod 45. Then, the handle 54 moves the roller 51 into engagement with the band 22, as shown in phantom in FIG. 1, to hold the band 22 against the spaced portions 49 (see FIG. 4) and 50 of the rod 45.

With the band 22 as tight as possible around the alternator 15 (see FIG. 1) at the time that the roller 51 engages the band 22 against the spaced portions 49 (see FIG. 4) and 50 of the rod 45, pivoting of the handle 17 from the position of FIG. 1 to the position of FIG. 2 or beyond moves the alternator 15 about its pivotal connection to the engine block. This shifts the pulley 12 sufficiently relative to the fixed pulley on the output shaft of the internal combustion engine to provide the desired tension on the belt 11.

As the handle 17 is being pivoted counterclockwise, as viewed in FIG. 1, the band 22 is tightened even further. This increased gripping power increases the force applied to the alternator 15 to tighten the belt 11.

With the belt 11 having the desired tension in it, the alternator 15 is retained in this position by the well-known locking means. Next, the handle 17 is pivoted from its position in FIG. 2 or beyond to its position in FIG. 1 and the roller 51 is rotated clockwise, as viewed in FIG. 1, away from engagement with the band 22. Then, the band 22 is pulled away from the alternator 15.

An advantage of this invention is that there is no damage to any movable element with which the tool of the present invention is used. Another advantage of this invention is that the flexible band is self tightening beyond its initial tightening. A further advantage of this invention is that it reduces the danger to a person tightening the belt. Still another advantage of this invention is that it provides positive gripping of the flexible band when it is wrapped around a movable element.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A tool for tightening a belt passing around a pulley on a shaft of a pivotal element including:
    a body for disposition on the pivotal element;
    flexible means for passing around the pivotal element, said flexible means being attached to said body;
    a handle;
    means to pivotally mount said handle on said body;
    said handle having means to releasably connect said flexible means to said handle after said flexible means has passed around the pivotal element so that pivoting of said handle relative to said body after said flexible means is connected to said handle by said releasably connecting means moves the pivotal element to tighten the belt passing around the pulley on the shaft of the pivotal element;
    and said body having elastomeric means mounted thereon for engagement with portions of the pivotal element not engaged by said flexible means when said flexible means is passed around the pivotal element.

2. The tool according to claim 1 in which:
    said releasably connecting means includes:
        first means mounted on said handle and having said flexible means pass thereover after said flexible means has passed around the pivotal element;
        and cam means mounted on said handle to retain said flexible means against said first means to releasably connect said flexible means to said handle;
    and said first means of said releasably connecting means includes a surface having two spaced portions so that said cam means engages said flexible means against said two spaced portions of said first means.

3. The tool according to claim 2 in which said body has guide means for said flexible means to provide a predetermined path for said flexible means after said flexible means has passed around the pivotal element until said flexible means passes over said first means of said releasably connecting means.

4. The tool according to claim 3 in which said cam means of said releasably connecting means includes:
    a roller;
    rotatably mounting means to rotatably mount said roller on said handle, said roller being eccentric to said rotatably mounting means;
    and means for rotating said roller about said rotatably mounting means to move said roller into engagement with said flexible means to retain said flexible means against said two spaced portions of said first means of said releasably connecting means.

5. The tool according to claim 4 in which said first means of said releasably connecting means includes:
    a rod attached to said handle;
    and said rod having a notch in its surface closest to said roller of said cam means, said notch having its two edges provide said two spaced portions of said first means against which said flexible means engages.

6. The tool according to claim 1 in which said body has guide means for said flexible means to provide a predetermined path for said flexible means after said flexible means has passed around the pivotal element until said flexible means passes over said releasably connecting means.

7. A tool for tightening a belt passing around a pulley on a shaft of a pivotal element including:
    a body for disposition on the pivotal element;
    flexible means for passing around the pivotal element, said flexible means being attached to one end of said body;
    a handle;
    means to pivotally mount said handle on said body;
    said handle having means to releasably connect said flexible means to said handle after said flexible means has passed around the pivotal element so that pivoting of said handle moves the pivotal element to tighten the belt passing around the pulley on the shaft of the pivotal element;
    said releasably connecting means including:
        first means mounted on said handle and having said flexible means pass thereover after said flexible means has passed around the pivotal element;
        and cam means mounted on said handle to retain said flexible means against said first means to releasably connect said flexible means to said handle;
    said first means of said releasably connecting means including a surface having two spaced portions so that said cam means engages said flexible means against said two spaced portions of said first means;
    said body having elastomeric means mounted thereon for engagement with the pivotal element when said flexible means is passed around the pivotal element;
    said body having guide means for said flexible means to provide a predetermined path for said flexible means after said flexible means has passed around the pivotal element until said flexible means passes over said first means of said releasably connecting means;
    said cam means of said releasably connecting means including:
        a roller;

rotatably mounting means to rotatably mount said
roller on said handle, said roller being eccentric
to said rotatably mounting means;

and means for rotating said roller about said rotatably mounting means to move said roller into engagement with said flexible means to retain said flexible means against said two spaced portions of said first means of said releasably connecting means;

said first means of said releasably connecting means including:
a rod attached to said handle;
and said rod having a notch in its surface closest to said roller of said cam means, said notch having its two edges provide said two spaced portions of said first means against which said flexible means engages;

and said guide means including:
a guide element on said body adjacent on end of said body remote from said one end of said body having said flexible means attached thereto;
a guide roller supported by said body adjacent said pivotal mounting means for said handle and having said flexible means pass therearound;
and a guide on said body extending above its upper surface.

8. A tool for tightening a belt passing around a pulley on a shaft of a pivotal element including:
a body for disposition on the pivotal element;
flexible means for passing around the pivotal element, said flexible means being attached to one end of said body;
a handle;
means to pivotally mount said handle on said body;
said handle having means to releasably connect said flexible means to said handle after said flexible means has passed around the pivotal element so that pivoting of said handle moves the pivotal element to tighten the belt passing around the pulley on the shaft of the pivotal element;
said releasably connecting means including:
first means mounted on said handle and having said flexible means pass thereover after said flexible means has passed around the pivotal element;
and cam means mounted on said handle to retain said flexible means against said first means to releasably connect said flexible means to said handle;
said first means of said releasably connecting means including a surface having two spaced portions so that said cam means engages said flexible means against said two spaced portions of said first means;
said cam means of said releasably connecting means including:
a roller;
rotatably mounting means to rotatably mount said roller on said handle, said roller being eccentric to said rotatably mounting means;
and means for rotating said roller about said rotatably mounting means to move said roller into engagement with said flexible means to retain said flexible means against said two spaced portions of said first means of said releasably connecting means;

said first means of said releasably connecting means including:
a rod attached to said handle;
and said rod having a notch in its surface closest to said roller of said cam means, said notch having its two edges provide said two spaced portions of said first means against which said flexible means engages;

said body having guide means for said flexible means to provide a predetermined path for said flexible means after said flexible means has passed around the pivotal element until said flexible means passes over said first means of said releasably connecting means;

and said guide means including:
a guide element on said body adjacent on end of said body remote from said one end of said body having said flexible means attached thereto;
a guide roller supported by said body adjacent said pivotal mounting means for said handle and having said flexible means pass therearound;
and a guide on said body extending above its upper surface.

9. A tool for tightening a belt passing around a pulley on a shaft of a pivotal element including:
a body for disposition on the pivotal element;
flexible means for passing around the pivotal element, said flexible means being attached to one end of said body;
a handle;
means to pivotally mount said handle on said body;
said handle having means to releasably connect said flexible means to said handle after said flexible means has passed around the pivotal element so that pivoting of said handle moves the pivotal element to tighten the belt passing around the pulley on the shaft of the pivotal element;
said body having elastomeric means mounted thereon for engagement with the pivotal element when said flexible means is passed around the pivotal element, said elastomeric means being disposed at each end of said body;
said body having guide means for said flexible means to provide a predetermined path for said flexible means after said flexible means has passed around the pivotal element until said flexible means passes over said releasably connecting means;
and said guide means including:
a guide element on said body adjacent on end of said body remote from said one end of said body having said flexible means attached thereto;
a guide roller supported by said body adjacent said pivotal mounting means for said handle and having said flexible means pass therearound;
and a guide on said body extending above its upper surface.

* * * * *

UNITED STATES PATENT AND TRADEMARK OFFICE
CERTIFICATE OF CORRECTION

PATENT NO. : 4,529,170
DATED : July 16, 1985
INVENTOR(S) : Minton E. Whitt, Sr. et al It is certified that error appears in the above-identified patent and that said Letters Patent is hereby corrected as shown below:

Column 2, line 58, after "invention" insert a -- comma (,) --.

Column 3, line 22, "a" should read -- an --.

Column 3, line 47, "tha" should read -- the --.

Column 7, line 19, "on" (second occurrence) should read -- an --.

Column 8, lines 19 to 26 should be indented the same as lines 6 to 11.

Column 8, line 19, "on" (second occurrence) should read -- an --.

Column 8, line 53, "on" (second occurrence) should read -- an --.

Signed and Sealed this

Fourteenth Day of January 1986

[SEAL]

Attest:

DONALD J. QUIGG

Attesting Officer

Commissioner of Patents and Trademarks